United States Patent
Hara et al.

(10) Patent No.: US 10,031,408 B2
(45) Date of Patent: Jul. 24, 2018

(54) SCREEN DEVICE, IMAGE DISPLAY SYSTEM, AND IMAGE DISPLAY METHOD FOR DISPLAYING AN IMAGE WITH A SCREEN PART HAVING AT LEAST ONE POLYHEDRON

(71) Applicant: KABUSHIKI KAISHA YASKAWA DENKI, Kitakyushu-shi (JP)

(72) Inventors: Koji Hara, Kitakyushu (JP); Yoshitaka Takemori, Kitakyushu (JP); Ichinao Sugiyama, Kitakyushu (JP); Haruhiko Koike, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/069,978

(22) Filed: Mar. 15, 2016

(65) Prior Publication Data
US 2016/0274449 A1    Sep. 22, 2016

(30) Foreign Application Priority Data

Mar. 18, 2015    (JP) .................................. 2015-055431

(51) Int. Cl.
*G03B 21/56* (2006.01)
*G03B 21/60* (2014.01)

(52) U.S. Cl.
CPC ............ *G03B 21/562* (2013.01); *G03B 21/56* (2013.01); *G03B 21/60* (2013.01)

(58) Field of Classification Search
CPC ....... G03B 21/562; G03B 21/56; G03B 21/60
See application file for complete search history.

(56) References Cited

U.S. PATENT DOCUMENTS

| | | | | | |
|---|---|---|---|---|---|
| 3,949,392 | A | * | 4/1976 | Caritato | .................... G09F 9/37 345/108 |
| 4,761,905 | A | * | 8/1988 | Black | ...................... G09F 9/375 340/815.53 |
| 5,057,828 | A | * | 10/1991 | Rousseau | .................. G09F 9/37 116/204 |
| 5,075,789 | A | * | 12/1991 | Jones | ..................... G09G 3/002 348/E5.131 |
| 5,175,637 | A | * | 12/1992 | Jones | ..................... G09G 3/002 348/E5.131 |

(Continued)

FOREIGN PATENT DOCUMENTS

| | | | |
|---|---|---|---|
| DE | 3533448 A1 * | 3/1987 | ........... G03B 21/001 |
| JP | 03-503939 | 8/1991 | |

(Continued)

OTHER PUBLICATIONS

Japanese Office Action for corresponding JP Application No. 2015-055431, dated Oct. 14, 2015.

(Continued)

*Primary Examiner* — Bao-Luan Le
(74) *Attorney, Agent, or Firm* — Mori & Ward, LLP

(57) ABSTRACT

This disclosure discloses a screen device. The screen device includes a screen part used for displaying an image, at least one polyhedron including a plurality of planes used as the screen part for displaying the image, and a first drive device configured to rotate the at least one polyhedron around at least one axis.

10 Claims, 12 Drawing Sheets

(56) References Cited

U.S. PATENT DOCUMENTS

| | | | | |
|---|---|---|---|---|
| 5,430,463 | A * | 7/1995 | Fontalirant | G09F 9/375 345/108 |
| 5,562,459 | A * | 10/1996 | Durlach | G09F 11/025 345/110 |
| 5,922,268 | A * | 7/1999 | Sheridon | G02B 26/026 264/108 |
| 6,497,942 | B2 * | 12/2002 | Sheridon | G02B 26/026 345/107 |
| 6,690,350 | B2 * | 2/2004 | Sheridon | G02B 26/026 345/107 |
| 6,853,486 | B2 * | 2/2005 | Cruz-Uribe | G02B 26/026 345/84 |
| 6,897,848 | B2 * | 5/2005 | Sheridon | G09F 9/375 345/107 |
| 6,903,871 | B2 * | 6/2005 | Page | B29C 33/307 359/277 |
| 7,609,444 | B2 * | 10/2009 | Garner | H04N 5/74 359/459 |
| 7,614,750 | B2 * | 11/2009 | May | G03B 21/56 353/29 |
| 8,130,184 | B2 * | 3/2012 | Garner | H04N 5/58 345/207 |
| 8,736,948 | B2 * | 5/2014 | Brown | G02B 26/026 345/108 |
| 2002/0089486 | A1 * | 7/2002 | Sheridon | G02B 26/026 345/107 |
| 2003/0130817 | A1 * | 7/2003 | Page | B29C 33/307 702/155 |
| 2006/0291049 | A1 * | 12/2006 | Juenger | H04N 9/3155 359/443 |
| 2007/0052638 | A1 * | 3/2007 | May | G03B 21/56 345/84 |

FOREIGN PATENT DOCUMENTS

| | | |
|---|---|---|
| JP | 05-34827 | 2/1993 |
| JP | 05-30879 U | 4/1993 |
| JP | 05-341411 | 12/1993 |
| JP | 07-234646 | 9/1995 |
| JP | 08-506425 | 7/1996 |
| JP | 10-31427 | 2/1998 |
| JP | 2005-295326 | 10/2005 |
| JP | 2010-247766 | 11/2010 |
| WO | WO 89/06825 | 7/1989 |
| WO | WO 8906825 A1 * | 7/1989 ............ G03B 21/62 |

OTHER PUBLICATIONS

Korean Office Action for corresponding KR Application No. 10-2016-0032665, dated Dec. 3, 2016 (w/ English machine translation).
URL: www.youtube.com/watch?v=NNVEVx_R9gw, HyperMatrix, Oct. 6, 2012, See Cite No. 2.
Chinese Office Action for corresponding CN Application No. 201610153071.4, dated Jun. 27, 2017.
Chinese Office Action for corresponding CN Application No. 201610153071.4, dated Feb. 11, 2018.

* cited by examiner

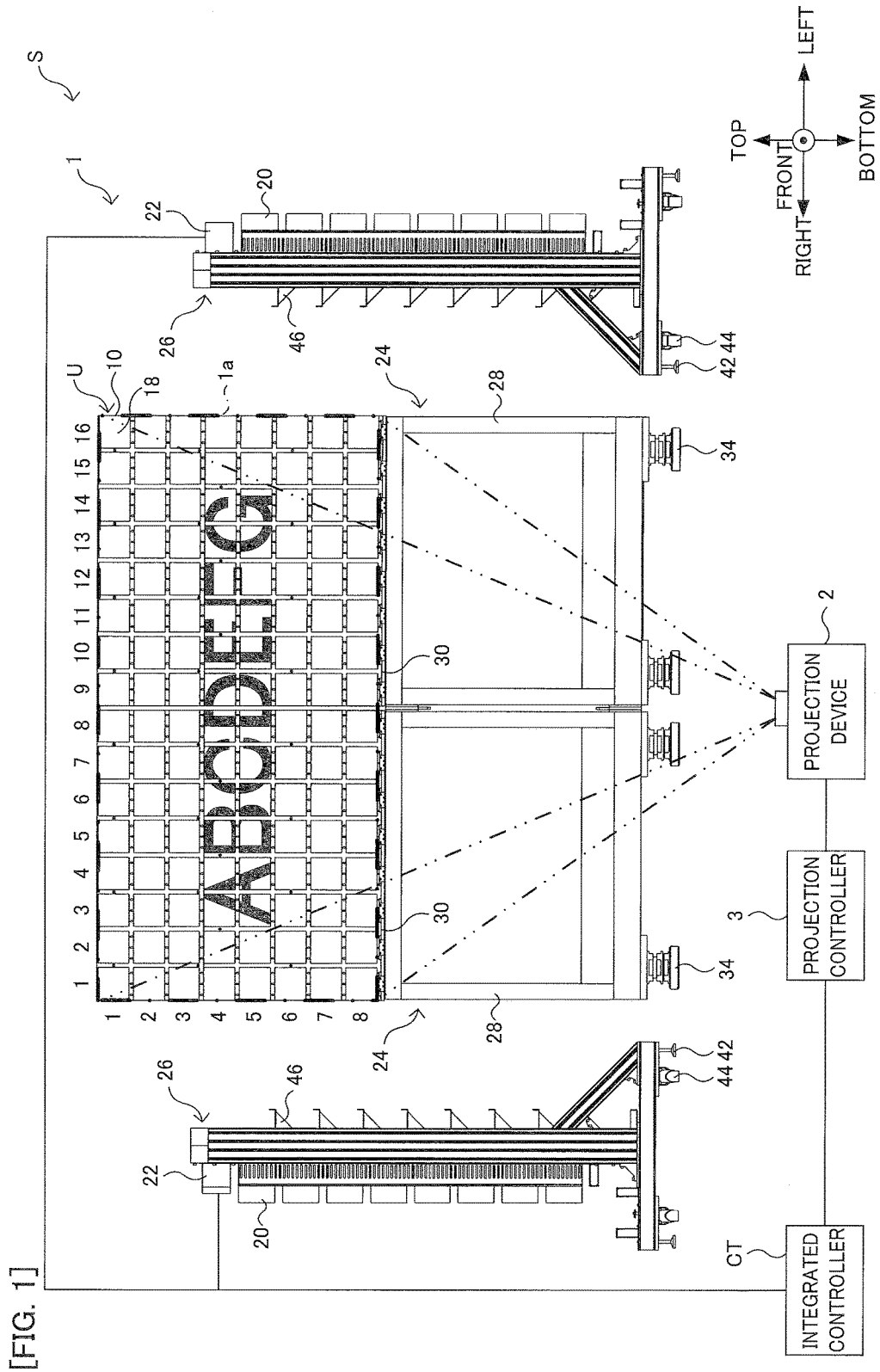

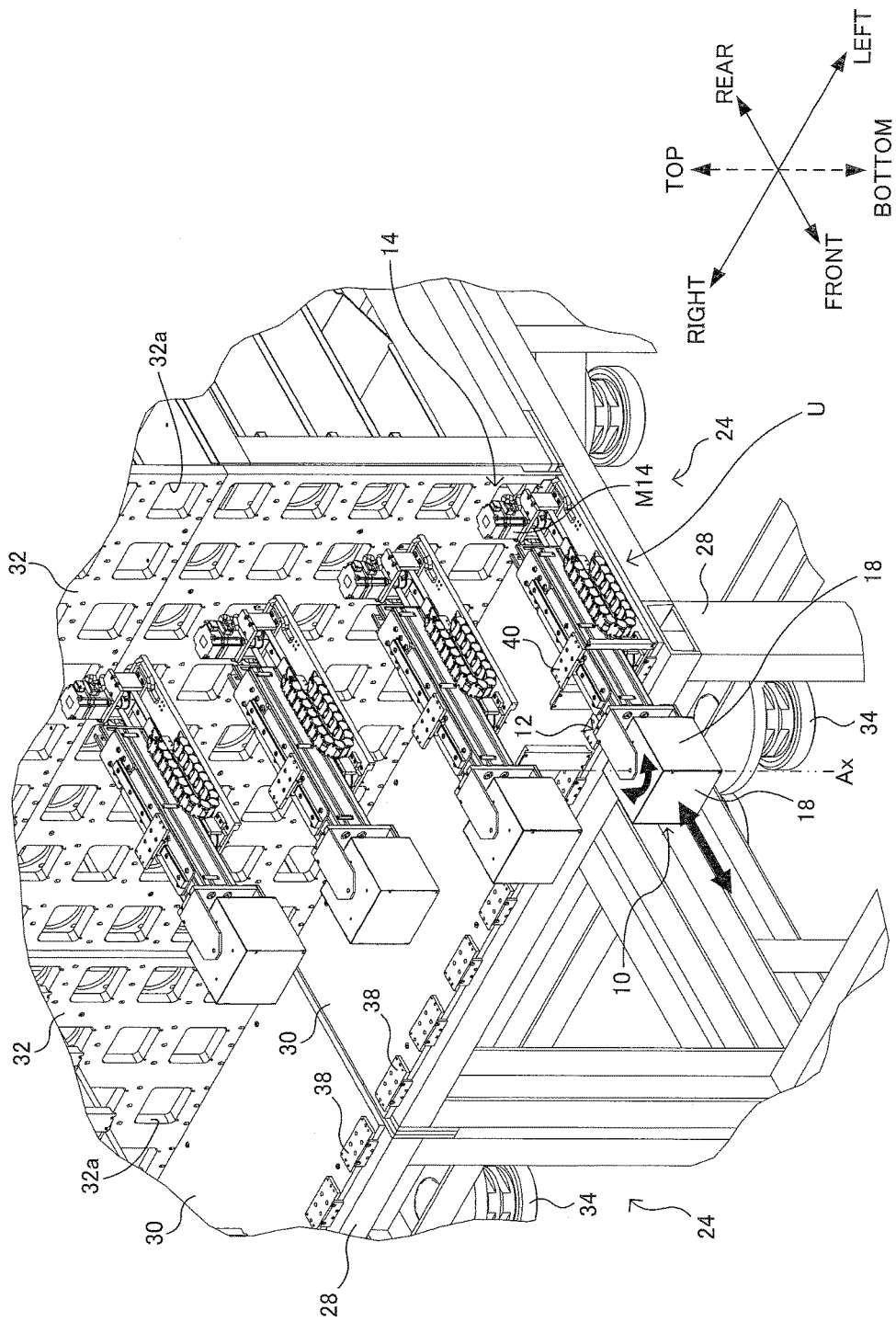
[FIG. 2]

[FIG. 3]
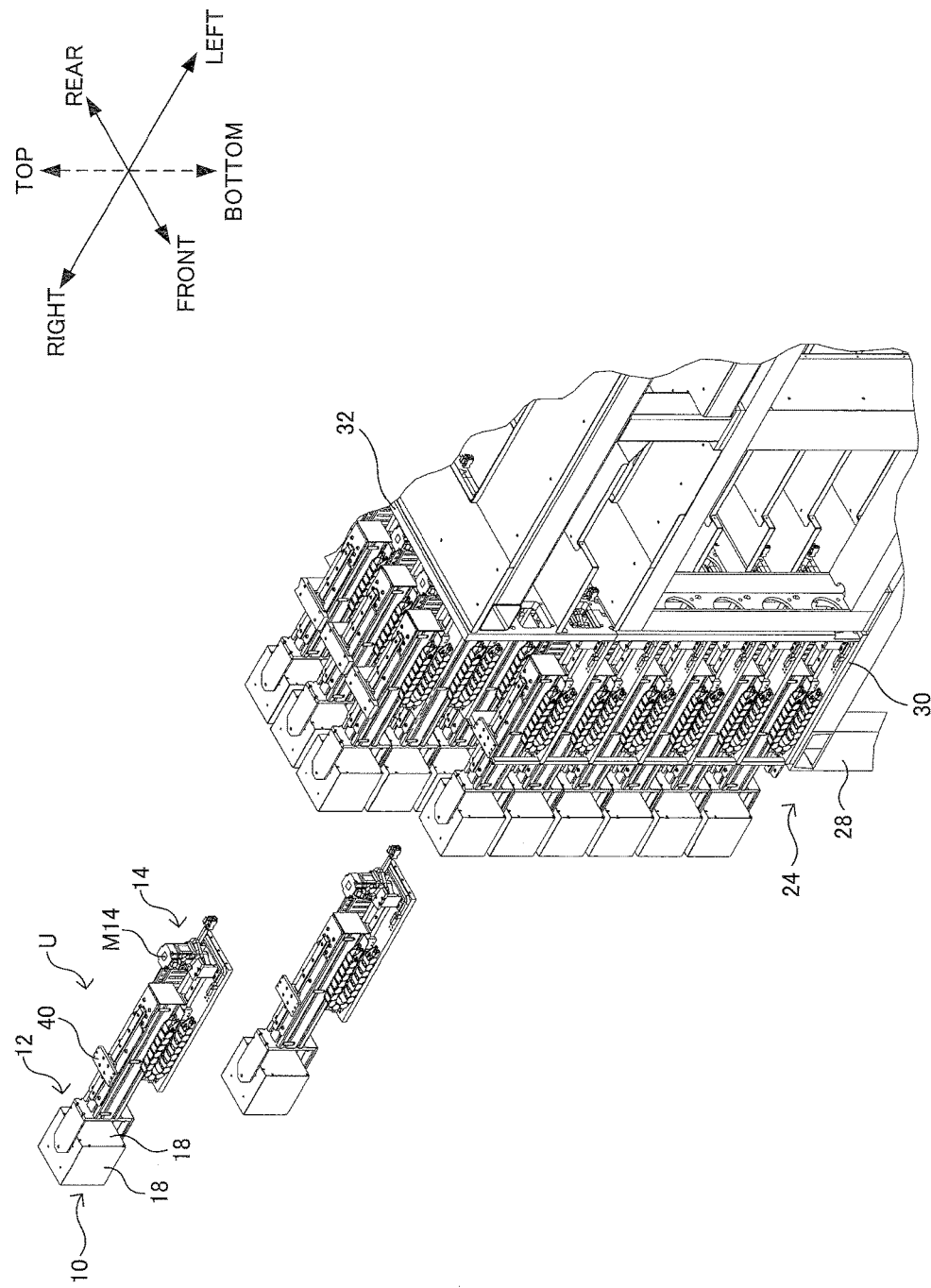

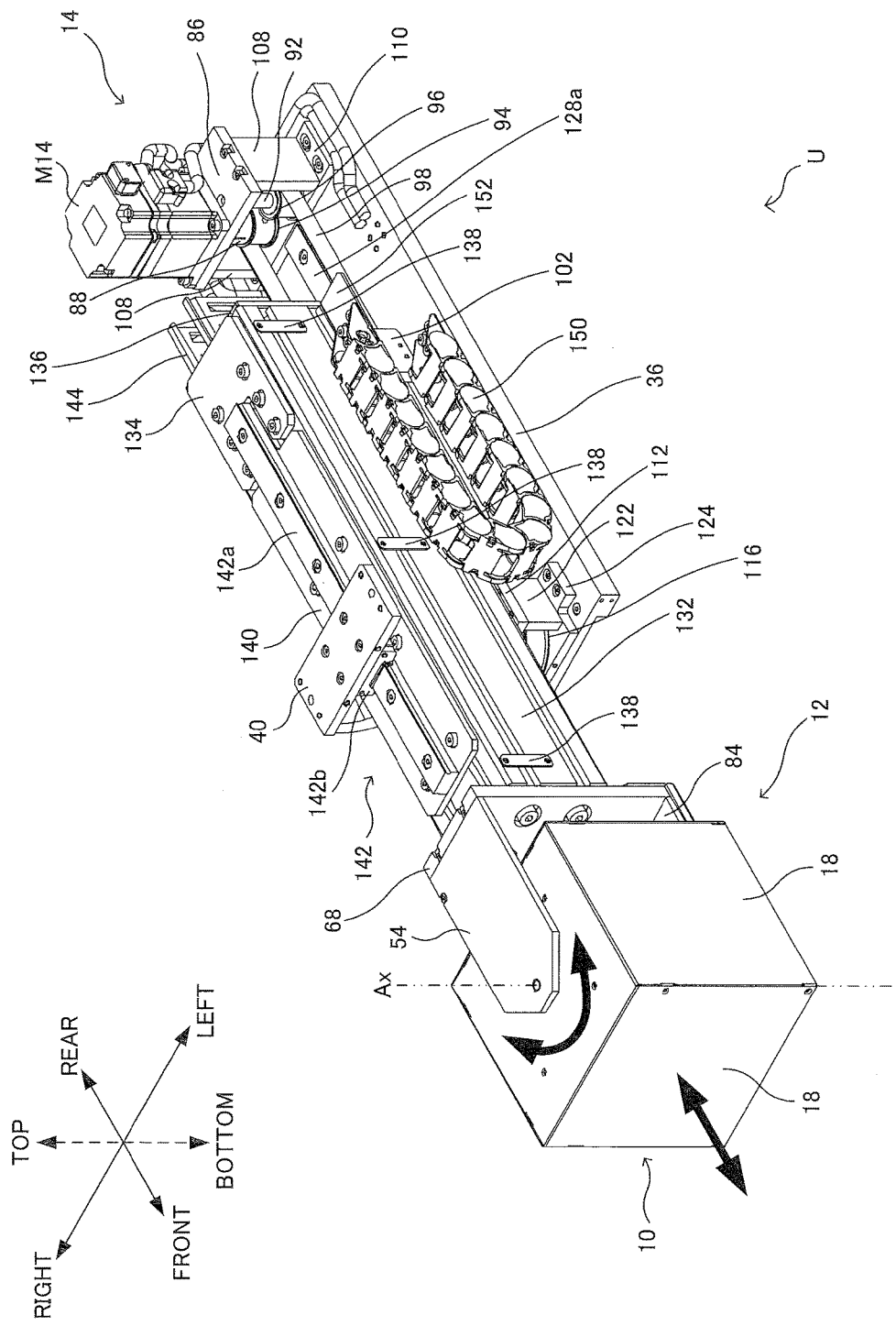
[FIG. 4]

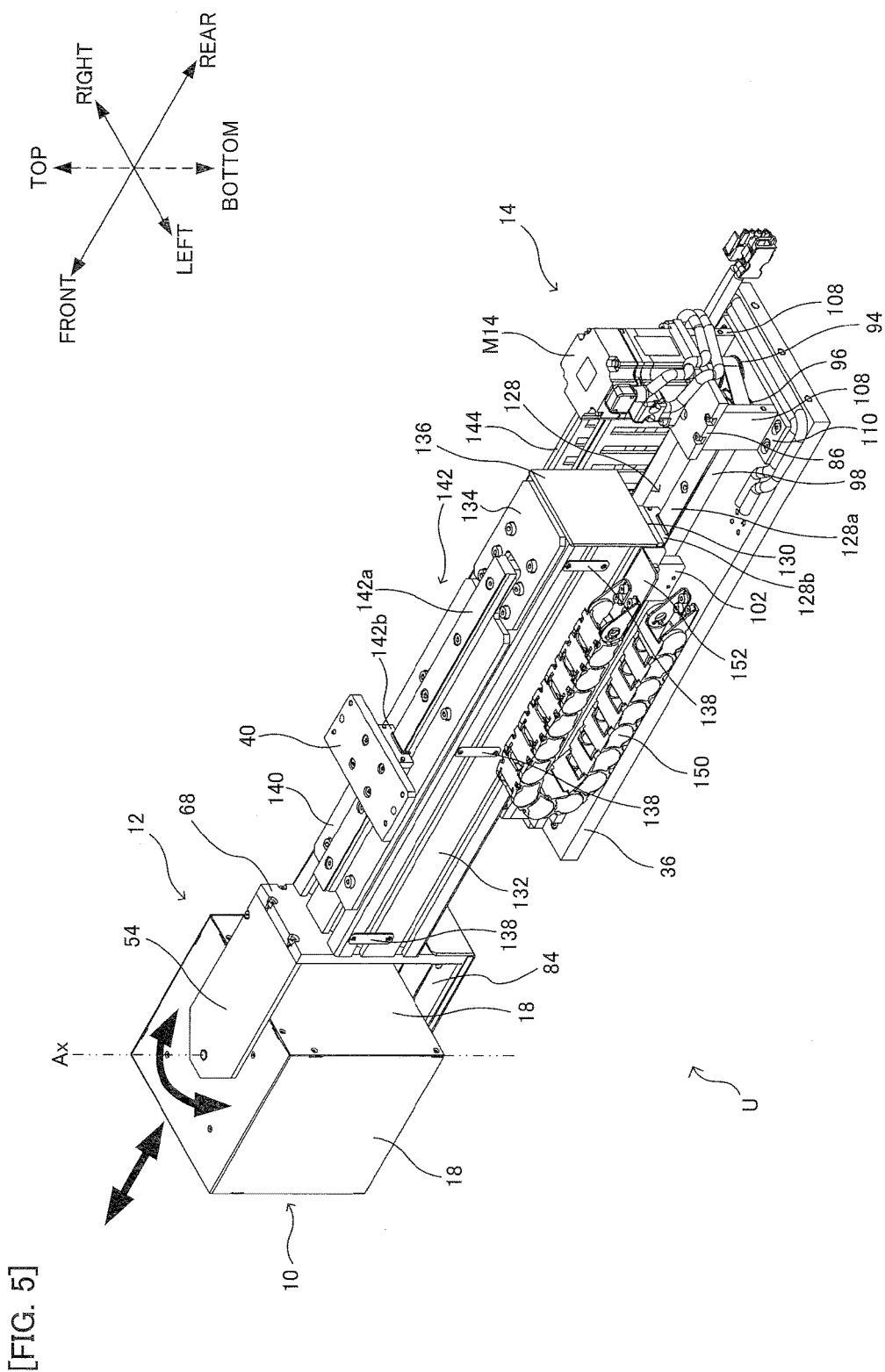
[FIG. 5]

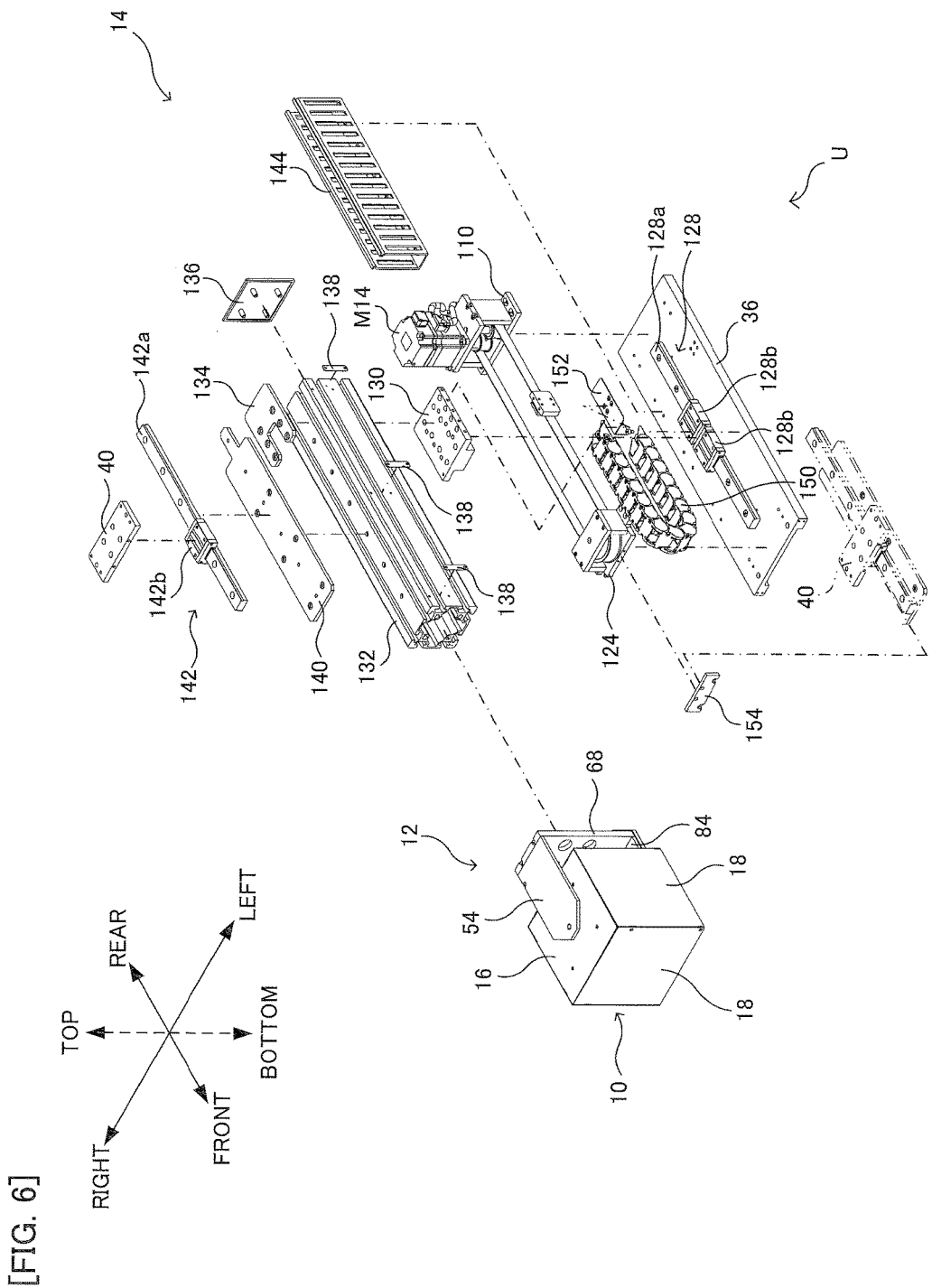
[FIG. 6]

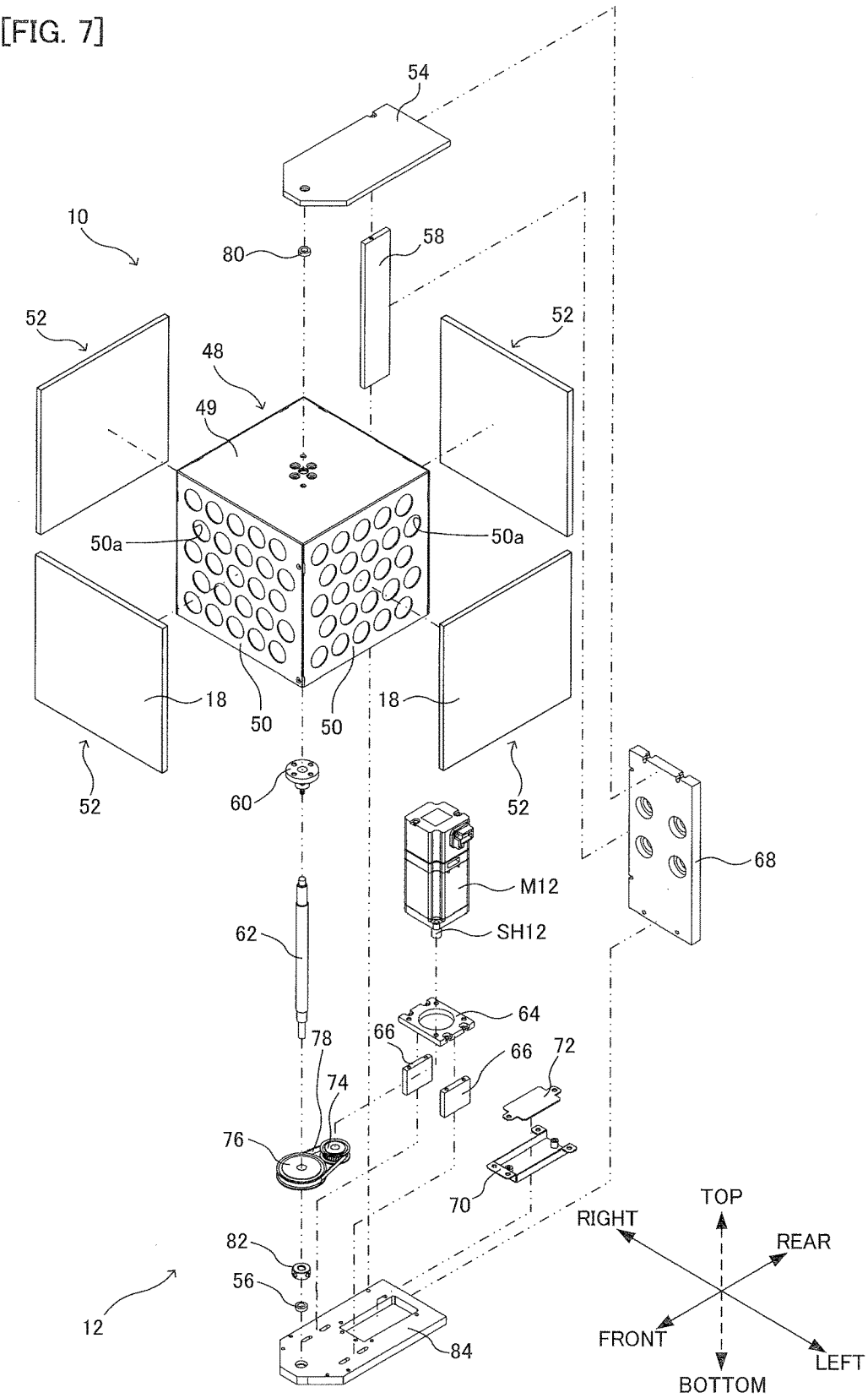
[FIG. 7]

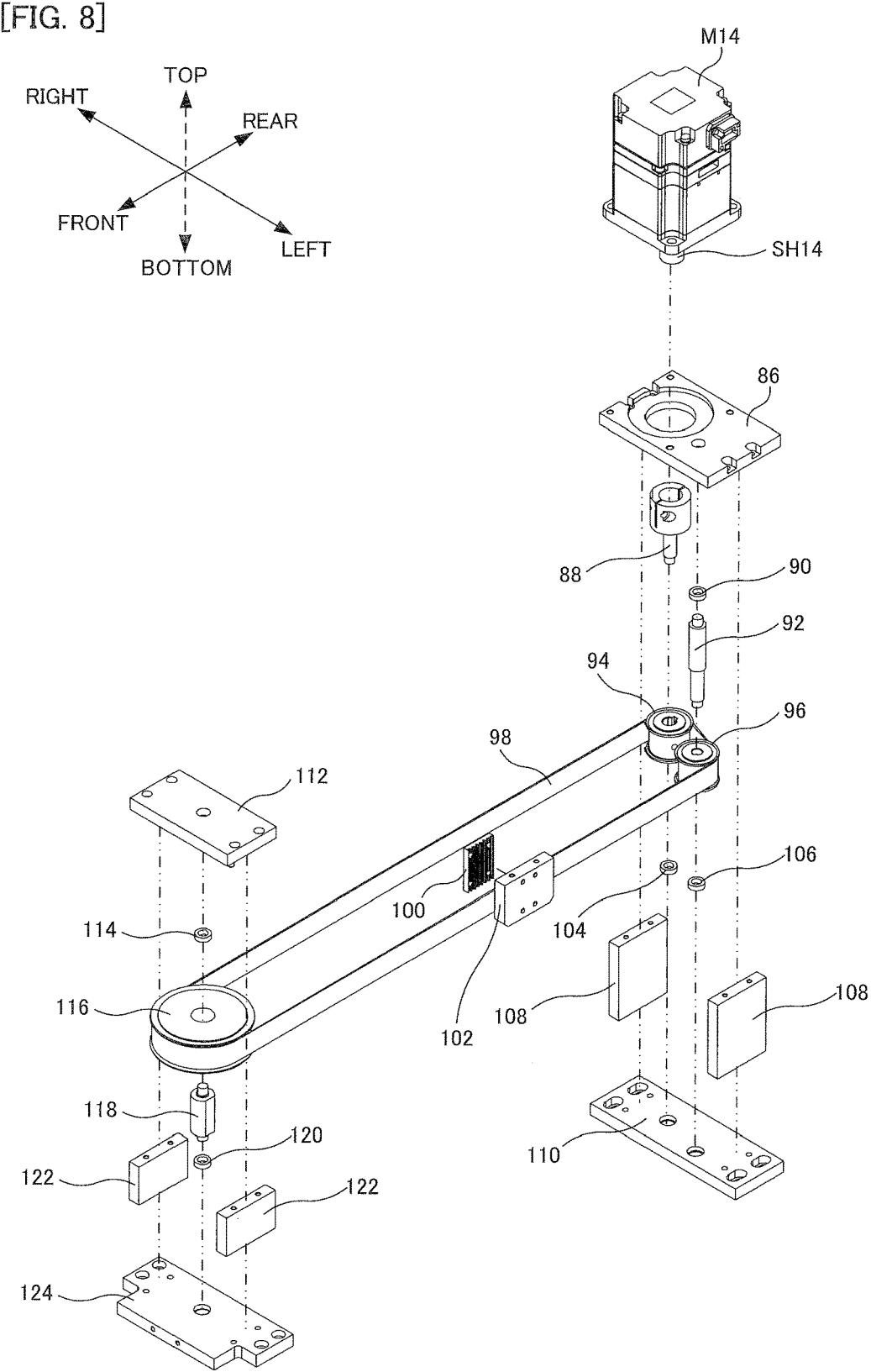

[FIG. 9A]
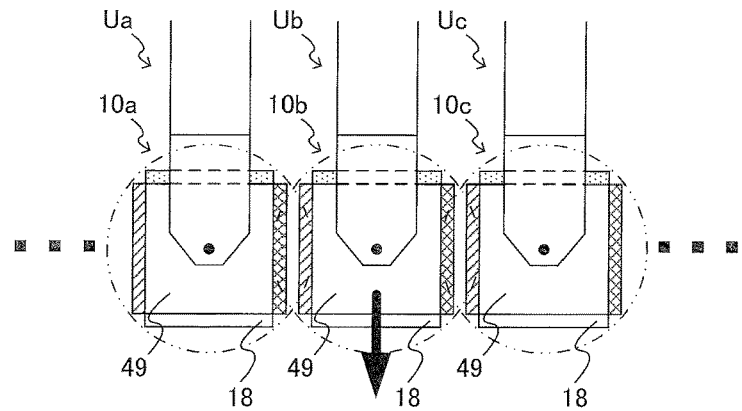
[FIG. 9B]
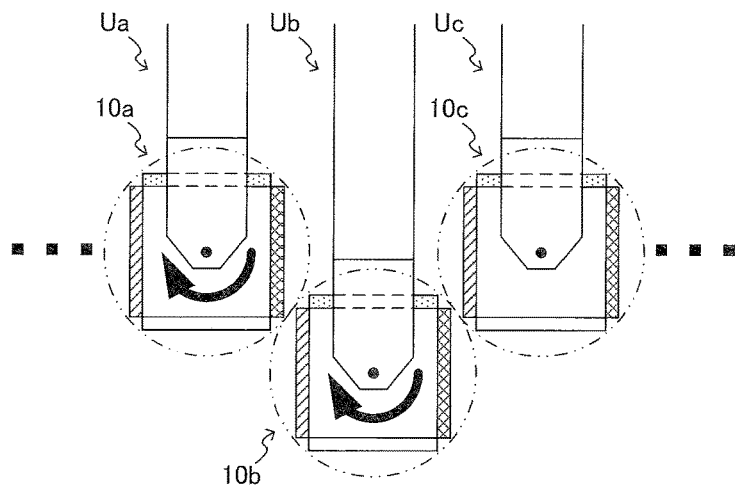
[FIG. 9C]
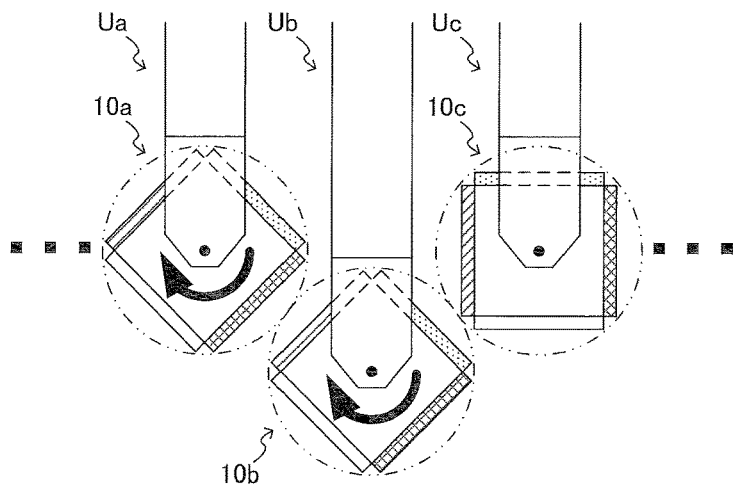

[FIG. 9D]
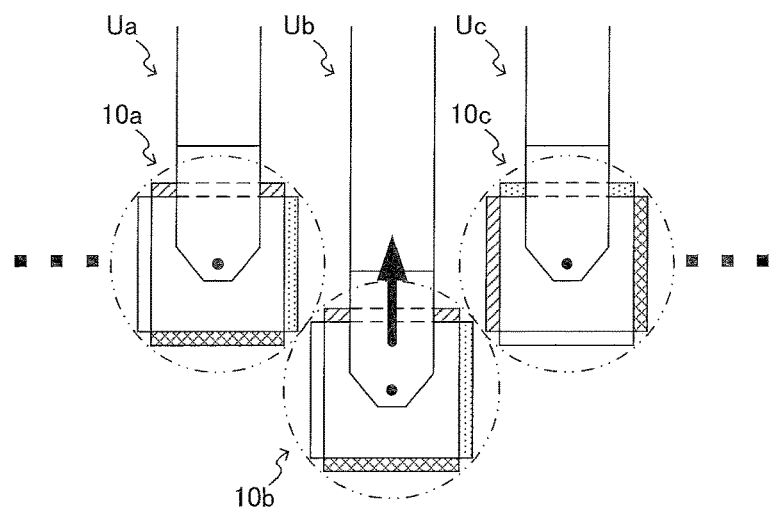
[FIG. 9E]
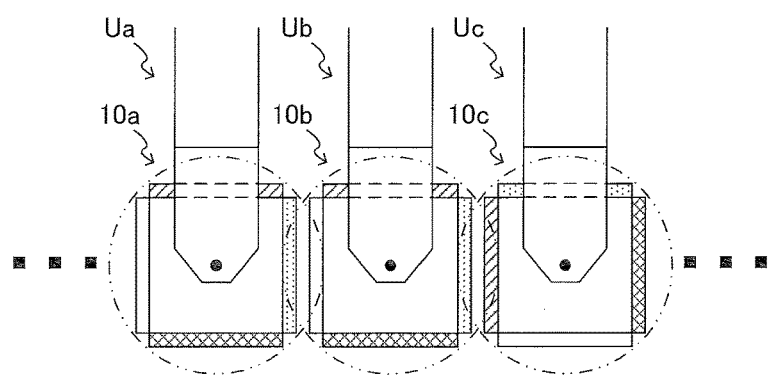

[FIG. 10A]
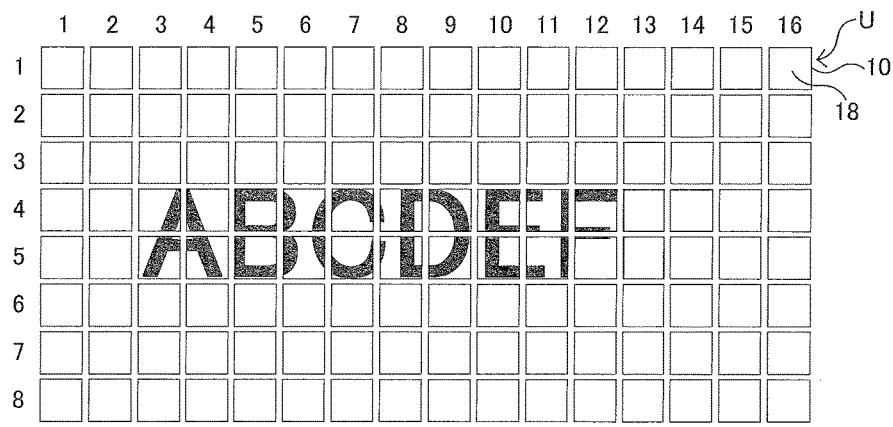
[FIG. 10B]
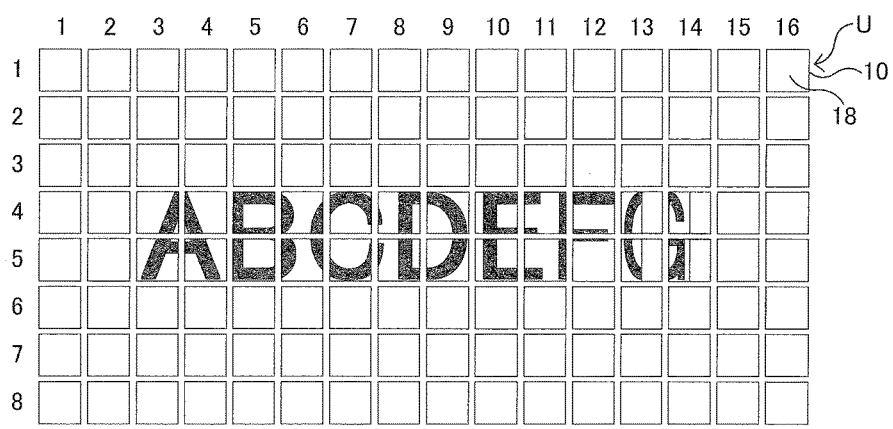
[FIG. 10C]
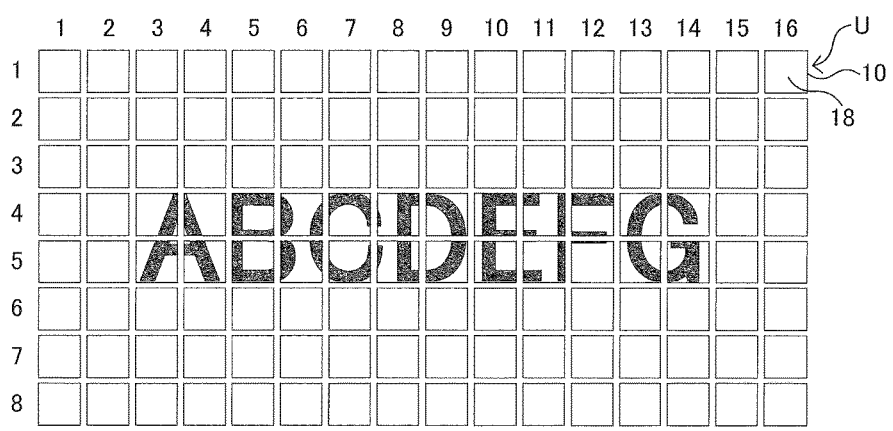

[FIG. 11A]
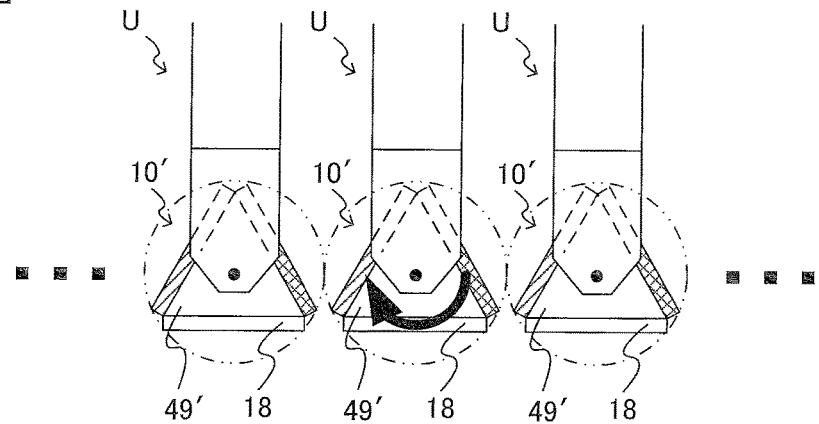
[FIG. 11B]
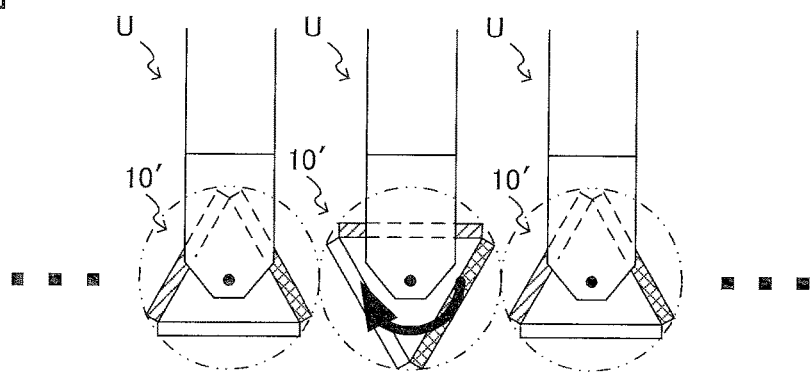
[FIG. 11C]
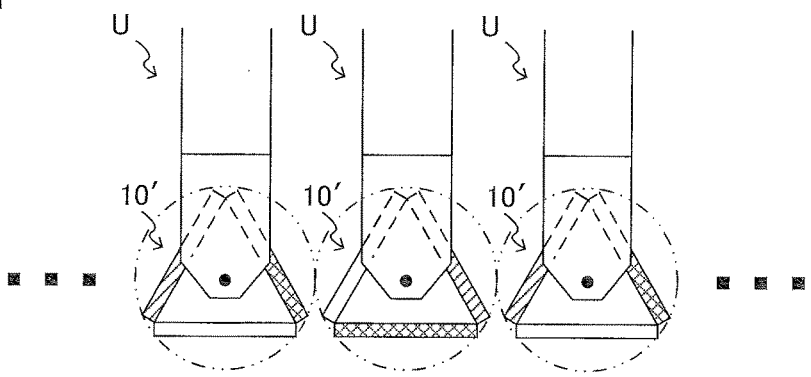

SCREEN DEVICE, IMAGE DISPLAY SYSTEM, AND IMAGE DISPLAY METHOD FOR DISPLAYING AN IMAGE WITH A SCREEN PART HAVING AT LEAST ONE POLYHEDRON

CROSS-REFERENCE TO RELATED APPLICATION

The present application claims priority from Japanese Patent Application No. 2015-055431, which was filed on Mar. 18, 2015, the disclosure of which is incorporated herein by reference in its entirety.

TECHNICAL FIELD

The embodiment discussed herein is related to a screen device, an image display system, and an image display method.

BACKGROUND

A video screen device having a screen body on one surface of which a projection surface is formed is known.

SUMMARY

According to one aspect of the disclosure, there is provided a screen device. The screen device includes a screen part used for displaying an image, at least one polyhedron including a plurality of planes used as the screen part for displaying the image, and a first drive device configured to rotate the at least one polyhedron around at least one axis.

BRIEF DESCRIPTION OF THE DRAWINGS

FIG. 1 is a configuration diagram showing an example of the overall configuration of an image display system of an embodiment.

FIG. 2 is a perspective view showing an example of the mode of support of a drive unit by a main platform.

FIG. 3 is a perspective view showing an example of the mode of support of the drive unit by the main platform.

FIG. 4 is a perspective view showing an example of the configuration of the drive unit.

FIG. 5 is a perspective view showing an example of the configuration of the drive unit.

FIG. 6 is an exploded perspective view showing an example of the configuration of the drive unit, esp. a linear drive device.

FIG. 7 is an exploded perspective view showing exemplary configurations of a screen member and a rotary drive device.

FIG. 8 is an exploded perspective view showing an exemplary configuration of a part of the linear drive device.

FIG. 9A is a schematic view for explaining an example of the contents of control performed when rotating the screen member.

FIG. 9B is a schematic view for explaining an example of the contents of control performed when rotating the screen member.

FIG. 9C is a schematic view for explaining an example of the contents of control performed when rotating the screen member.

FIG. 9D is a schematic view for explaining an example of the contents of control performed when rotating the screen member.

FIG. 9E is a schematic view for explaining an example of the contents of control performed when rotating the screen member.

FIG. 10A is a schematic view for explaining an example of actions of an image display system in accordance with an image display method.

FIG. 10B is a schematic view for explaining an example of the actions of the image display system in accordance with the image display method.

FIG. 10C is a schematic view for explaining an example of the actions of the image display system in accordance with the image display method.

FIG. 11A is a schematic view for explaining an exemplary configuration of the screen member and an exemplary behavior occurring when rotating the screen member, in a modification example using a triangular prism shaped screen member.

FIG. 11B is a schematic view for explaining an exemplary configuration of the screen member and an exemplary behavior occurring when rotating the screen member.

FIG. 11C is a schematic view for explaining an exemplary configuration of the screen member and an exemplary behavior occurring when rotating the screen member.

DESCRIPTION OF THE EMBODIMENTS

An embodiment will now be described with reference to the drawings. In this specification and the drawings, constituent elements having substantially the same functions are designated in principle by the same reference numerals and will not repeatedly be described as appropriate. The directions of "front", "rear", "left", "right", "top", and "bottom" noted in the drawings correspond respectively to the directions described as "front", "rear", "left", "right", "top", and "bottom". However, the positional relationships between the constituent elements of the screen device, etc. are not limited to the concepts of "front", "rear", "left", "right", "top", and "bottom".

The embodiment is applicable to various types of screen devices for use in displaying an image. As used herein, "image" refers to a thing fixed visually on a medium. Accordingly, "image" encompasses all of characters, symbols, figures, etc., all of those that have been handwritten, printed, and created by a computer, and both still images and moving images. The following description will be given, as an example, of the case where the screen device displays an image projected by a projection device.

1. Example of Overall Configuration of Image Display System

An example of the overall configuration of an image display system of the embodiment will be described with reference to FIGS. 1 to 3.

As shown in FIGS. 1 to 3, an image display system S includes a screen device 1, one or more projection devices 2 projecting an image onto a screen part 1a of the screen device 1 (only a single projection device 2 projecting an image from the front onto the screen part 1a is shown in FIG. 1), a projection controller 3 connected intercommunicably (connected for intercommunication) to the projection device 2 for controlling actions of the projection device 2. In the example of FIG. 2, an image "ABCDEFG" is projected onto the screen part 1a.

(1-1. Example of Screen Device)

The screen device 1 is a device displaying an image projected from the projection device 2. The screen device 1 includes a screen member 10, a rotary drive device 12, a linear drive device 14, a motor control device 20, a controller 22, a main platform 24, a sub-platform 26, and an integrated controller CT. In this example, the screen member 10, the rotary drive device 12, and the linear drive device 14 are unitized into a drive unit U. The screen member 10, the rotary drive device 12, and the linear drive device 14 may not at least partially be unitized.

(1-1-1. Example of Drive Unit)

This example includes 128 drive units U. The 128 drive units U are arranged in a lattice pattern in the longitudinal direction (top-bottom direction in this example) and the transverse direction (left-right direction in this example) with the same orientation (orientation where the screen member 10 is in front in this example). More specifically, the 128 drive units U are arranged in a matrix of 16 columns in the transverse direction and 8 rows in the longitudinal direction. Numbers indicative of the positions (orders) of the 128 drive units in the transverse direction and the longitudinal direction are appended in FIG. 1. The arrangement and the number of the units may be other than the above (only a single drive unit is also available).

The screen member 10 has a cube (regular hexahedron) shape. The screen member 10 has four side surfaces (front, rear, left, and right surfaces in the states of FIGS. 2 and 3), each forming a screen surface 18 onto which an image is projected. The screen member 10 corresponds to an example of "polyhedron" and "cube". The four screen surfaces 18 of the screen member 10 correspond to an example of "a plurality of planes used for display of an image". The screen part 1a is made up of the screen surfaces 18 of 128 screen members 10.

The rotary drive device 12 is a device rotating the screen member 10 of the same drive unit U around a vertical axis Ax. Hereinafter, the rotation of the screen member 10 around the vertical axis Ax is referred to appropriately as "lateral rotation". The rotary drive device 12 corresponds to an example of "first drive device". The rotary drive device 12 drives the screen member 10 of the same drive unit U to rotate laterally around the vertical axis Ax, to thereby vary the orientations (positions) of the four screen surfaces 18 of the screen member 10, enabling the screen surfaces 18 onto which an image is projected to be switched. The rotary drive device 12 may be configured to rotate the screen member 10 around a horizontal axis along the left-right direction. Hereinafter, the rotation of the screen member 10 around the horizontal axis is referred to appropriately as "vertical rotation". Alternatively, the rotary drive device 12 may be capable of driving the screen member 10 to perform both the lateral rotation and the vertical rotation.

The linear drive device 14 is a device moving the screen member 10 of the same drive unit U in a direction (front-rear direction in this example) perpendicular to the direction of plane of the screen part 1a. The linear drive device 14 corresponds to an example of "second drive device". The front-rear direction corresponds to an example of "first direction". The direction of movement of the screen member 10 by the linear drive device 14 may be any direction other than the front-rear direction as long as it intersects the direction of plane of the screen part 1a.

(1-1-2. Example of Motor Control Device)

The motor control device 20 is connected intercommunicably to a motor M12 (see FIG. 7 described later) of the rotary drive device 12 and a motor M14 of the linear drive device 14, of the drive unit U to be controlled, to control the actions of the motors M12 and M14. For example, the motor control device 20 acquires position data, etc. from encoders (not shown) of the motors M12 and M14 in relation to the drive unit to be controlled, to control the actions of the motors M12 and M14 based on the position data. The motors M12 and M14 are not limited to be the servo motors described above, and may be stepping motors that operate in synchronism with a pulse power supplied from the motor control device 20. This example includes 128 motor control devices 20 in total, each capable of controlling the motors M12 and M14 related to a single drive unit U. A single motor control device may be capable of controlling the actions of the motors M12 and M14 related to two or more drive units U.

(1-1-3. Example of Controller)

The controller 22 is connected intercommunicably to a motor control device 20 related to a drive unit U to be controlled, to control the actions of the motors M12 and M14 related to the drive unit U by way of the motor control device 20. The controller 22 corresponds to an example of "first controller". This example includes two controllers 22 in total, each configured to be capable of controlling 64 drive units U. More specifically, the controller 22 on one hand (controller 22 located on the left side of FIG. 1 in this example) controls 64 drive units U lying in the first to eighth columns in the transverse direction and in the first to eighth rows in the longitudinal direction, among 128 drive units U. The controller 22 on the other (controller 22 located on the right side of FIG. 1 in this example) controls 64 drive units U lying in the ninth to sixteenth columns in the transverse direction and in the first to eighth rows in the longitudinal direction, among 128 drive units U. The number of the drive units U controllable by a single controller 22 is not limited to 64, and any different number of drive units U may be controlled by the single controller 22. For example, the single controller 22 may control all of the drive units U.

(1-1-4. Example of Main platform)

The main platform 24 is a platform supporting the drive units U. This example includes two main platforms 24 in total, each one supporting 64 drive units U controllable by one controller 22, among 128 drive units U. The main platform 24 corresponds to an example of "platform". More specifically, the two main platforms 24 are arranged side by side in the transverse direction and linked together. The main platform 24 on one hand (main platform 24 located on the left side of FIG. 1) supports 64 drive units U lying in the first to eighth columns in the transverse direction and in the first to eighth rows in the longitudinal direction, to be controlled by the controller 22 on one hand. The main platform 24 on the other (main platform 24 located on the right side of FIG. 1) supports 64 drive units U lying in the ninth to sixteenth columns in the transverse direction and in the first to eighth rows in the longitudinal direction, to be controlled by the controller 22 on the other. The number and range of the drive units U supported by one main platform 24 may be any number and range other than the above. For example, one main platform 24 may support all of the drive units U.

Each of the main platforms 24 includes a frame member 28, a base 30, a back base 32, and a plurality of legs fixed to the lower end of the frame member 28, and is configured to be able to stand by itself and adjustable in height by the plurality of legs 34. The main platforms 24 may not be configured to be able to stand by themselves and may not be configured to be adjustable in height.

The base 30 is fixed to the frame member 28 such that the plane direction of the base 30 is in the horizontal direction (direction perpendicular to the top-bottom direction in this example). The top surface of the base 30 has at its front end eight guide adaptors 38 aligned in the transverse direction and fixed thereto via which 8 drive units U lying in the eighth row in the longitudinal direction among 64 drive units U are fixed to the top surface of the base 30. 56 drive units U lying in the first to seventh rows in the longitudinal direction among 64 drive units U are fixed to guide adaptors 40 described later of their respective immediately underlying drive units U and thereby fixed to the underlying drive units U.

The back base 32 is fixed to the frame member 28 such that the plane direction of the back base 32 is in a direction (direction perpendicular to the front-rear direction in this example) perpendicular to the plane direction of the base 30. The 64 drive units U are fixed to the front surface of the back base 32. The back base 32 has, in the vicinity of positions where the drive units U are fixed, insertion holes 32a through which cables, etc. are inserted.

(1-1-5. Example of Sub-Platform)

The sub-platform 26 is a platform supporting the controller 22 and the motor control devices 20. This example includes two sub-platforms 26 in total, each supporting one of the two controllers 22 and 64 motor control devices 20 controllable by the one controller 22 among 128 motor control devices 20. Although in the example of FIG. 1, the two sub-platforms 26 are arranged separately on both sides in the left-right direction of the main platform 24, the arrangement of the two sub-platforms 26 is not particularly limited. For example, the two sub-platforms 26 may be arranged on one side in the left-right direction of the main platform 24 or may be arranged at the rear, etc. of the main platform 24. The sub-platform 26 on one hand (in this example, the sub-platform 26 located on the left side of the main platform 24 in FIG. 1) supports the controller 22 on one hand controlling 64 drive units U lying in the first to eighth columns in the transverse direction and in the first to eighth rows in the longitudinal direction, and supports 64 motor control devices 20 connected to the one controller 22. The sub-platform 26 on the other (in this example, the sub-platform 26 located on the right side of the main platform 24 in FIG. 1) supports the controller 22 on the other controlling 64 drive units U lying in the ninth to sixteenth columns in the transverse direction and in the first to eighth rows in the longitudinal direction, and supports 64 motor control devices 20 connected to the other controller 22. The controllers 22 and the motor control devices 20 may be supported by the main platform 24.

Each of the sub-platforms 26 includes a plurality of legs 42, a plurality of casters 44, and a plurality of racks 46 storing cables, etc. Each sub-platform 26 is configured to be able to stand by itself by the plurality of legs 42 and be movable by the plurality of casters 44.

(1-1-6. Example of Integrated Controller)

The integrated controller CT is connected intercommunicably to the two controllers 22 and the projection controller 3, to control the two controllers 22 in an integrated manner. The integrated controller CT corresponds to an example of "second controller". For example, the integrated controller CT acquires information (hereinafter, referred to appropriately as "timing information") indicative of image projection timing from the projection controller 3, to control the controllers 22 in an integrated manner based on the timing information. Thus, based on the control of the integrated controller CT, the controllers 22 can control the actions of the motors M12 and M14 related to 64 drive units U to be controlled, in synchronism with an image projected from the projection device 2, by way of the motor control devices 20. In the case that only a single controller 22 is disposed, the integrated controller CT may be excluded.

The thus configured image display system S projects a desired image onto the screen part 1a at a desired position to execute so-called "projection mapping", while simultaneously allowing desired screen members 10 to perform rotary motions and linear motions in synchronism with the projected image. In the specification, the synchronization between the image and the motions of the screen members 10 (actions of the motors M12 and M14) may not be a synchronization in the strict sense, and may be a synchronization in a relatively negligent sense, enough for audience eyes to feel that the image and the screen members 10 move at the same time.

The above described configuration of the image display system S and the screen device 1 is merely an example, and configurations other than the above may be employed. For example, the screen members 10 may perform only the rotary motions without any linear motions, and, in this case, the linear drive units 14 may be excluded. The shape of the screen members 10 is not limited to the cube, and may be other polyhedrons such as a triangular prism for example (see also a modification example of 5-1 described later).

2. Configuration Example of Drive Unit

An example of the configuration of the drive unit U will then be described with reference to FIGS. 4 to 8.

As shown in FIGS. 4 to 8, the drive unit U includes the screen member 10, the rotary drive device 12, and the linear drive device 14.

(2-1. Example of Screen Member)

The screen member 10 includes a downward-open hollow cubic frame member 48 having a top surface 49 (top surface in the state of FIG. 7) and four side surfaces 50 (front, rear, left, and right surfaces in the state of FIG. 7), and four flat plates 52 fixed on the side surfaces. That is, in the screen member 10, each of surfaces of the four flat plates forms the screen surface 18. The four screen surfaces 18 are all white surfaces in this example. The side surfaces 50 of the frame member 48 each have a plurality of holes 50a so as to reduce the weight of the frame member 48.

The above described configuration of the screen member 10 is merely an example, and configurations other than the above may be employed. For example, the number of the screen surfaces 18 of the screen member 10 is not limited to four, and it may be three or less, or five or more. One of the side surfaces of the screen member 10 may be a protection surface subjected to a water repellent treatment for example so that the screen part 1a is made up of the protection surfaces when the screen device 1 is at a stop (when no image is projected). The screen surface 18 is not limited to the white surface, and black or other color surfaces or surfaces with light sources, etc. may be employed.

(2-2. Example of Rotary Drive Device)

As shown in FIG. 7, the rotary drive device 12 includes a B-base 84, an R-base 68, a U-base 54, an S-base 58, two S-bases 66, a motor base 64, the motor M12 in the form of a rotary motor, pulleys 74 and 76, a belt 78, a main shaft 62, a collar 82, bearings 56 and 80, a shaft holder 60, and cable covers 70 and 72. Among these constituent elements of the rotary drive device 12, the two S-bases 66, motor base 64, motor M12, pulleys 74 and 76, belt 78, main shaft 62, collar 82, shaft holder 60, cable covers 70 and 72, etc. are disposed within the interior of the screen member 10.

The R-base 68 is fixed at its lower end to the rear end of the B-base 84. The U-base 54 is fixed at its rear end to the upper end of the R-base. The S-base 58 is fixed at its rear end, upper end, and lower end to the right end of the R-base

68, the right rear end of the U-base 54, and the right rear end of the B-base 84, respectively. The screen member 10 is interposed between the B-base 84 and the U-base 54 in the top-bottom direction.

The two S-bases 66 are fixed to the top surface of the B-base 84. The motor M12 is fitted via the motor base 64 to the top ends of the two S-bases 66.

The pulley 74 is interposed between the two S-bases 66. A motor shaft SH12 of the motor M12 is fixed to the inner periphery of the pulley 74 so that the pulley 74 rotates together with the motor shaft SH12. The belt 78 of the endless type is attached to the outer periphery of the pulley 74. The belt 78 is attached also to the outer periphery of the pulley 76 so that the pulley 76 rotates on the vertical axis Ax following the rotation of the pulley 74.

The main shaft 62 is fixed at its lower end to the inner periphery of the pulley 76. At a still lower end of the main shaft 62 below the position where it is fixed to the pulley 76, the main shaft 62 passes through the collar 82 and is supported rotatably relative to the B-base 84 via the bearing 56 fitted to the B-base 84. The main shaft 62 is fixed at its upper end to the shaft holder 60 fastened to the inner surface of the top surface 49 of the screen member 10. At a still upper end of the main shaft 62 above the position where it is fixed to the shaft holder 60, the main shaft 62 passes through the top surface 49 of the screen member 10 and is supported rotatably relative to the U-base 54 via the bearing 80 fitted to the U-base 54.

The cable cover 70 having the cable cover 72 fastened thereto is fixed on the top surface of the B-base 84.

In the thus configured rotary drive device 12, when the motor M12 is driven, the motor shaft SH 12 rotates so that its torque is transmitted via the pulley 74, belt 78, and pulley 76 to the main shaft 62, with the result that the main shaft 62 rotates around the vertical axis Ax. Consequently, the rotary drive device 12 can rotate the screen member 10 coupled to the main shaft 62 laterally around the vertical axis Ax together with the main shaft 62.

The above described configuration of the rotary drive device 12 is merely an example and the configuration may be other than the above. The power transmission mechanism of the motor M12 of the rotary drive device 12 is not limited to the mechanism using the pulleys and belt as above, and may be for example one using gears or chains. The motor M12, etc. of the rotary drive device 12 may be disposed outside of the screen member 10.

(2-3. Example of Linear Drive Device)

As shown in FIGS. 6, 8, etc., the linear drive device 14 includes a main base 36, M-bases 86 and 110, two S-bases 108, the motor M14 in the form of a rotary motor, pulleys 94, 96, and 116, an M-shaft 88, bearings 90, 104, 106, 114, and 120, a belt 98, a P-shaft 92, P-bases 112 and 124, two S-bases 122, a P-shaft 118, a belt base 102, a belt metal fitting 100, linear guides 128 and 142, an M-table 130, a frame 132, a frame support 134, a frame cover 136, a G-base 140, the guide adaptor 40, three cable covers 138, a cableveyor (registered trademark) 150, a bearer bracket 152, and a wiring duct 144.

The M-base 110 is fixed to the top surface closer to the rear end of the main base 36. The two S-bases 108 are fixed to the top surface of the M-base 110. The motor M14 is fitted via the M-base 86 to the top surfaces of the two S-bases 108.

The pulley 94 is interposed between the two S-bases 108. The M-shaft 88 is fixed to the inner periphery of the pulley 94, with the motor shaft SH14 of the motor M14 being secured to the M-shaft 88. At a still lower end of the M-shaft 88 below the position where it is fixed to the pulley 94, the M-shaft 88 is supported rotatably relative to the M-base 110 via the bearing 104 fitted to the M-base 110. Accordingly, the pulley 94 rotates together with the motor shaft SH14 and M-shaft 88. The belt 98 of the endless type is attached to the outer periphery of the pulley 94.

The pulley 96 is disposed in the vicinity of the pulley 94 between the two S-bases 108. The P-shaft 92 is fixed at its lower end to the inner periphery of the pulley 96. The P-shaft 92 is supported at its upper end rotatably relative to the M-base 86 via the bearing 90 fitted to the M-base 86. At a still lower end of the P-shaft 92 below the position where it is fixed to the pulley 96, the P-shaft 92 is supported rotatably relative to the M-base 110 via the bearing 106 fitted to the M-base 110. The belt 98 is attached to the outer periphery of the pulley 96 so that the pulley 96 rotates following the rotation of the pulley 94.

The P-base 124 is fixed to the top surface closer to the front end of the main base 36. The two S-bases 122 are fixed to the top surface of the P-base 124. The P-base 112 is fixed to the top surfaces of the two S-bases 122. The pulley 116 is interposed between the two S-bases 122. The P-shaft 118 is fixed at its upper end to the inner periphery of the pulley 116. At a still upper end of the P-shaft 118 above the position where it is fixed to the pulley 116, the P-shaft 118 is supported rotatably relative to the P-base 112 via the bearing 114 fitted to the P-base 112. The P-shaft 118 is supported at its lower end rotatably relative to the P-base 124 via the bearing 120 fitted to the P-base 124. The belt 98 is attached to the outer periphery of the pulley 116 so that the pulley rotates following the rotation of the pulley 94.

The belt base 102 is attached via the belt metal fitting 100 to the outer peripheral side of the belt 98 so that the belt base 102 moves in the front-rear direction along with the rotation of the belt 98.

As shown in FIG. 6, the linear guide 128 is disposed on the top surface of the main base 36 at the inner peripheral side of the belt 98. The linear guide 128 includes a rail 128a fixed to the top surface of the main base 36 so as to extend in the front-rear direction, and two blocks 128b slidable on the rail 128a. The M-table 130 is fixed to the top surfaces of the two blocks 128b. The top surface of the M-table 130 lies above the upper end of the belt 98. The frame 132 is fixed, together with the frame support disposed on its top surface, to the top surface of the M-table 130.

The frame cover 136 is fixed to the rear end of the frame 132. The G-base 140 is fixed to the top surface of the frame 132.

The linear guide 142 is disposed on the top surface of the G-base 140. The linear guide 142 includes a rail 142a fixed to the top surface of the G-base 140 so as to extend in the front-rear direction, and a block 142b fitted onto the rail 142a. The rail 142a and the block 142b are configured to be relatively slidable in the front-rear direction. The guide adaptor 40 is fixed to the top surface of the block 142b. The guide adaptor 40 is fixed via a P-flange 154 to the front end of the P-base 124 related to an overlying drive unit U. In FIG. 6, a drive unit U having the linear drive device 14 indicated by solid lines is shown as a reference, with constituent elements of an underlying drive unit U being indicated by imaginary lines.

The front end of the frame 132 is fixed to the rear surface of the R-base 68. The three cable covers 138 are fixed to the left surface of the frame 132.

The cableveyor 150 receiving a cable is fixed, via the bearer bracket 152 secured to one end thereof, to the top surface of the M-table 130. The other end of the cableveyor 150 is fixed to the left end of the top surface of the main base 36.

The wiring duct 144 receiving the cable is disposed on the right end of the top surface of the main base 36.

In the thus configured linear drive device 14, when the motor M14 is driven, the motor shaft SH14 and the M-shaft 88 rotate so that the resultant torque is transmitted via the pulley 94, the belt 98, the pulleys 96 and 116 to the P-shafts 92 and 118 to rotate the P-shafts 92 and 118. Along with the rotation of the belt 98, at this time, the belt base 102, the M-table 130, the frame 132, etc. move in the front-rear direction while being guided by the linear guides 128 and 142. As a result, the linear drive device 14 enables the screen member 10 coupled to the frame 132 to move in the front-rear direction together with the frame 132, etc.

The above described configuration of the linear drive device 14 is merely an example, and the configuration may be other than the above. For example, the mechanism transmitting power of the motor M14 the linear drive device 14 is not limited to the mechanism using the pulleys and the belt, and it may be a mechanism using gears or chains. The power generation source of the linear drive device 14 may be a linear motor, etc.

3. Action Example of Image Display System

An example of the actions of the image display system S will then be described.

(3-1. Control Content Example in Rotating Screen Member)

In this example, the 128 screen members 10 are arranged such that with the positions of transversely adjacent screen members 10 being identical in the front-rear direction, gaps between the adjacent screen members 10 are set to be as small as possible so that circumeircles as rotation trajectories of the contours of the adjacent screen members 10 overlap partially with each other (see FIG. 9A described later). Based on the control of the integrated controller CT, each controller 22 controls the actions of the motors M12 and M14 by way of the motor control devices 20 so that when laterally rotating one or both of the transversely adjacent screen members 10, the one or both of the adjacent screen members 10 are rotated after positionally shifting the adjacent screen members 10 in the front-rear direction.

Referring to FIGS. 9A to 9E, an example of the above motions of the screen member 10 based on the control of the controller 22 will be described hereinbelow. FIGS. 9A to 9E show representatively only three drive units U (designated at "Ua", "Ub", and "Uc" in the diagrams) related to three transversely adjacent screen members 10 (designated at "10a", "10b", and "10c" in the diagrams) among 128 screen members 10. The following description will be given of the case as an example where the screen members 10a and 10b rotate laterally around the vertical axis Ax. For the convenience of description, in FIGS. 9A to 9E, the four screen surfaces 18 of each screen member 10 are shown in different modes from one another.

In FIGS. 9A to 9E, all of the screen members 10a, 10b, and 10c are located in the rear in the state of FIG. 9A. In this state, the circumcircles related to the screen members 10a, 10b, and 10c overlap partially with each other.

In the drive unit Ub, the linear drive device 14 is driven based on the control of the controller 22 so that the screen member 10b moves frontward (see FIGS. 9A and 9B). In the state of FIG. 9B, the circumcircles related to the screen members 10a, 10b, and 10c do not overlap with each other.

Afterward, in each of the drive units Ua and Ub, the rotary drive device 12 is driven based on the control of the controller 22 so that each of the screen members 10a and 10b rotates laterally around the vertical axis Ax (see FIGS. 9B to 9D). At this time, the screen members 10a, 10b, and 10c do not interfere with each other because their respective circumcircles do not overlap with each other.

Thereafter, in the drive unit Ub, the linear drive device 14 is driven based on the control of the controller 22 so that the screen member 10b moves rearward (see FIGS. 9D and 9E). In this state, the circumcircles related to the screen members 10a, 10b, and 10c again overlap partially with each other.

(3-2. Action Example by Image Display Method)

As described above, while projecting a desired image at a desired position on the screen part 1a to execute a projection mapping, the image display system S can rotate and linearly move desired screen members 10 in synchronism with the projected image. That is, the image display system S can synchronize the image projected on the screen part 1a from the projection device 2 with the rotational motion of the screen member 10 around the vertical axis Ax.

An example of the actions of the image display system S in accordance with the above image display method will hereinbelow be described with reference to FIGS. 10A to 10C.

In FIGS. 10A to 10C, an image "ABCDEF" is projected across the screen surfaces 18 of 20 screen members 10 lying in the third to twelfth columns in the transverse direction and the fourth to fifth rows in the longitudinal direction in the state of FIG. 10A, with all of 128 screen members 10 being located in the rear.

Then, in the state where the above image is projected, two screen members 10 in the thirteenth column in the transverse direction and the fourth and fifth rows in the longitudinal direction move frontward, after which a laterally rotating image "G" is projected across the screen surfaces 18 of four screen members 10 in the thirteenth and fourteenth columns in the transverse direction and the fourth and fifth rows, so that the four screen members 10 rotate laterally in synchronism with the rotation of the image (see FIG. 10B). This results in the state where an image "ABCDEFG" is projected across the screen surfaces 18 of 24 screen members 10 lying in the third to fourteenth columns in the transverse direction and the fourth and fifth rows in the longitudinal direction (see FIG. 10C).

The actions of the image display system S described above are merely an example, and actions other than the above may be performed.

In the above, at least one motion of the rotary drive device 12 and the linear drive device 14 corresponds to an example of means for executing at least one motion of a rotary motion around at least one axis and a movement motion in a first direction intersecting a plane direction of the screen part, of the at least one polyhedron.

4. Example of Effect by the Embodiment

As described above, the image display system S of the embodiment includes the screen device 1 and the projection device 2. The screen device 1 has the screen devices 10 and the rotary drive devices 12 so that the screen members 10 can be rotated by the rotary drive devices 12. This enables the screen members 10 to be rotated while displaying the projected image, with the result that expression modes based on the rotational motions of the screen members 10 can be imparted to the screen device 1 so that the range of expression can be increased to a large extent. Thus, due to the synergy between the image displays and the actual rotational motions of the screen members 10, the audience can be given a stronger impression and even entertained.

Particularly, in the embodiment, the screen device 1 has the linear drive devices 14 so that the screen members 10 can be moved in the front-rear direction by the linear drive devices 14. That is, the screen device 1 can move the screen members 10 linearly in addition to rotating the same, so that more complicated actions become feasible. This further increases the expression modes of the screen device 1 so that the range of expression can further be enlarged.

Particularly, in the embodiment, the screen device 1 includes the controller 22, the controller 22 controlling the rotary drive devices 12 and the linear drive devices 14 so as to rotate one or both of adjacent screen members 10, with the adjacent screen members 10 being positionally shifted in the front-rear direction. By controlling the actions of the screen members 10 in this manner, the screen members 10 can be rotated while arranging the plurality of screen members 10 so as to minimize the gaps between adjacent screen members 10. Thus, the gaps between the screen members 10 can be reduced in the plane direction of the screen part 1a so that the image display performances can be improved.

Particularly, in the embodiment, the controller 22 controls the rotary drive devices 12 and the linear drive devices 14 in synchronism with a projected image. This enables the screen members 10 to perform motions (rotations and linear movements) in accordance with the content of the projected image. Thus, due to the synergy between the image displays and the actual motions (rotations and linear movements) of the screen members 10, the audience can be given a stronger impression and even entertained.

Particularly, in the embodiment, the screen member 10, the rotary drive device 12, and the linear drive device 14 are unitized as a drive unit U. A plurality of drive units U arranged in a lattice pattern in the longitudinal direction and the transverse direction are supported by the main platform 24, for each number of the drive units controllable by the controller 22. This enables the plurality of drive units U and the controller 22 controlling the same can be unitized for each main platform 24. In this case, the screen device 1 can electrically or mechanically be extended or reduced on a unit-by-unit basis, consequently facilitating its extension and reduction. In the embodiment, the main platform 24 can stand alone so that the screen device 1 can easily be disposed without using anchor bolts, etc.

Particularly, in the embodiment, a plurality of main platforms are arranged side by side, and the screen device 1 includes the integrated controller CT integratedly controlling a plurality of controllers 22 corresponding one-to-one to the plurality of main platforms. This enables the numbers of the controllers 22 and main platforms 24 to be increased within the range controllable by the integrated controller CT. Accordingly, the extensibility can be enhanced.

Particularly, in the embodiment, the motor M12, etc. of the rotary drive device 12 is disposed within the interior of the screen member 10. As a result, the disposition spaces for the motor M12, etc. are not needed, contributing to downsizing of the drive unit U.

Particularly, in the embodiment, the screen member 10 has a cube shape, and the rotary drive device 12 rotates the cubic screen member 10 laterally around the vertical axis Ax, to switch a screen surface used for displaying an image to another one. Thus, as compared with the case of the vertical rotation where the motor M12, etc. of the rotary drive device 12 disposed inside the cubic screen member 10 are supported on a cantilever and therefore become unstable, the lateral rotation enables the motor M12, etc. of the rotary drive device 12 to be supported from below, achieving a structural stability without increasing the number of the components.

5. Modification Example, Etc.

The embodiment is not limited to the above contents and may variously be modified without departing from the spirit and technical idea thereof. Such modification examples will be described hereinbelow.

(5.1 Case of Using Triangular Prism Shaped Screen Member)

Although in the above embodiment, description has been given of the case as an example where the cube shaped screen member 10 is used as the polyhedron, a regular triangular prism shaped screen member 10' as shown in FIG. 11A to 11C for example may be used. In the screen member 10', each of its three side surfaces forms the screen surface 18. At this time, a plurality of screen members 10' rotated laterally around the vertical axis Ax may be arranged such that with the positions of transversely adjacent screen members 10' being identical in the front-rear direction, circum-circles as rotation trajectories of the contours of the adjacent screen members 10' do not overlap with each other. In this case, irrespective of the state where the positions of the transversely adjacent screen members 10' are identical in the front-rear direction, one or both of the adjacent screen members 10' can smoothly be rotated laterally. Thus, the modification example enables the screen members 10 to be rotated without any linear motions.

(5-2. Case of Use Combined with General Screen)

Although in the above embodiment, etc., description has been given of the case as an example where an image is projected on the screen part 1a of the screen device 1, the image may be projected e.g. on a combined region of the screen part 1a of the screen device 1 and a general screen without rotary motion and linear motion. In this case, for example, the general screen having an image display region similar to that of the screen part 1a is disposed above the screen part 1a of the screen device 1 so that the image is projected by the projection device 2 onto the combined region of the screen part 1a and the general screen positioned just above. In such a case, the range of expression can be increased while expanding the image display region to about two times by a relatively inexpensive configuration.

(5-3. Case of Application to Other Screen Device)

Although in the above, description has been given of the case as an example where the screen device 1 displays an image projected by the projection device 2, the present disclosure may be applied to e.g. a screen device implementing a so-called "human letter", in which a previously printed image is displayed on each of a plurality of screen surfaces of the screen member to express a pattern or a letter as a whole. In this case, similarly to the above embodiment, etc., the screen member is rotated by the rotary drive device so that the screen surface used for the display of an image is switched, thereby enabling the range of expression to increase to a large extent. Thus, due to the synergy between the image displays and the actual rotational motions of the screen members, the audience can be given a stronger impression and even entertained.

(5-4. Others)

It is noted that if terms "vertical," "parallel," "plane," etc. are used in the above description, these terms are not used in the exact meanings thereof. Specifically, these terms "vertical," "parallel," and "plane" allow tolerances and errors in design and manufacturing and have meanings of "approximately vertical," "approximately parallel," and "approximately plane."

It is noted that if terms "same," "equal," "different," etc. in relation to a dimension and a size of the appearance are used in the above description, these terms are not used in the exact meaning thereof. Specifically, these terms "same," "equal," and "different" allow tolerances and errors in design and manufacturing and have meanings of "approximately the same," "approximately equal," and "approximately different."

In addition, techniques by the embodiment and each modified example may be appropriately combined and utilized in addition to the examples having already described above.

In addition to that, although exemplification is not performed one by one, the embodiment and each modified example are carried out by various changes being applied thereto without departing from the spirit of the present disclosure.

What is claimed is:

1. A screen device comprising:
a screen part used for displaying an image;
a plurality of polyhedrons that include a plurality of planes used as the screen part for displaying the image;
a plurality of first drive devices that include a first motor configured to rotate a respective one of the plurality of polyhedrons around at least one axis such that a rotation trajectory of each of the plurality of polyhedrons defines a circumcircle;
a plurality of second drive devices that include a second motor configured to move a respective one of the plurality of polyhedrons in a first direction intersecting a plane direction of the screen part; and
a first controller that controls the first motors and the second motors in synchronism with the image projected on the screen part by a projection device,
wherein gaps in the plane direction between adjacent polyhedrons of the plurality of polyhedrons are set such that the circumcircles defined by the rotation trajectories of the adjacent polyhedrons overlap partially with each other, and
wherein the first controller is configured to control the first motors and the second motors such that when positions of the adjacent polyhedrons are shifted in the first direction, one or both of the adjacent polyhedrons are rotated.

2. The screen device according to claim 1, further comprising:
a plurality of drive units that include respective ones of the polyhedrons, the first drive devices, and the second drive devices; and
at least one platform supporting the plurality of drive units, the drive units being arranged in a lattice pattern in a longitudinal direction and a transverse direction, for each number of the drive units controllable by the first controller.

3. The screen device according to claim 2, wherein:
the at least one platform includes a plurality of platforms arranged side by side,
the screen device further comprises
a second controller configured to control integratedly a plurality of the first controllers respectively corresponding to the plurality of platforms.

4. The screen device according to claim 1, wherein:
each first motor is disposed within an interior of a respective one of the polyhedrons.

5. The screen device according to claim 4, wherein:
each of the polyhedrons is a cube,
each first motor is configured to rotate the cube around a vertical axis to switch the plane used as a part of the screen part for displaying the image.

6. The screen device according to claim 1,
wherein the first controller is configured to control the second motors to move each of the plurality of polyhedrons between a first position and a second position in the direction intersecting the plane direction,
wherein when one of the adjacent polyhedrons is in the first position while an other one of the adjacent polyhedrons is in the first position, the circumcircles defined by the rotation trajectories of the adjacent polyhedrons overlap partially with each other, and
wherein when the one of the adjacent polyhedrons is in the first position while the other one of the adjacent polyhedrons is in the second position, the circumcircles defined by the rotation trajectories of the adjacent polyhedrons do not overlap with each other.

7. An image display system comprising:
a screen device including a screen part used for displaying an image; and
a projection device configured to project the image onto the screen part of the screen device,
the screen device comprising:
a plurality of polyhedrons that include a plurality of planes used as the screen part for displaying the image;
a plurality of first drive devices that include a first motor configured to rotate a respective one of the plurality of polyhedrons around at least one axis such that a rotation trajectory of each of the plurality of polyhedrons defines a circumcircle;
a plurality of second drive devices that include a second motor configured to move a respective one of the plurality of polyhedrons in a first direction intersecting a plane direction of the screen part; and
a first controller that controls the first motors and the second motors in synchronism with the image projected on the screen part by the projection device,
wherein gaps in the plane direction between adjacent polyhedrons of the plurality of polyhedrons are set such that the circumcircles defined by the rotation trajectories of the adjacent polyhedrons overlap partially with each other, and
wherein the first controller is configured to control the first motors and the second motors such that when positions of the adjacent polyhedrons are shifted in the first direction, one or both of the adjacent polyhedrons are rotated.

8. The image display system according to claim 7,
wherein the first controller is configured to control the second motors to move each of the plurality of polyhedrons between a first position and a second position in the direction intersecting the plane direction,
wherein when one of the adjacent polyhedrons is in the first position while an other one of the adjacent polyhedrons is in the first position, the circumcircles defined by the rotation trajectories of the adjacent polyhedrons overlap partially with each other, and
wherein when the one of the adjacent polyhedrons is in the first position while the other one of the adjacent polyhedrons is in the second position, the circumcircles defined by the rotation trajectories of the adjacent polyhedrons do not overlap with each other.

9. An image display method for displaying an image projected on a screen part including a plurality of polyhedrons comprising:

controlling a plurality of first motors configured to rotate a respective one of the polyhedrons around at least one axis such that a rotation trajectory of each of the plurality of polyhedrons defines a circumcircle and a plurality of second motors configured to move a respective one of the polyhedrons in a first direction intersecting a plane direction of the screen part such that the image projected on the screen part synchronizes with a rotary motion of the polyhedrons and a movement motion of the polyhedrons, wherein gaps in the plane direction between adjacent polyhedrons of the plurality of polyhedrons are set such that the circumcircles defined by the rotation trajectories of the adjacent polyhedrons overlap partially with each other, and wherein the image display method further comprises controlling the first motors and the second motors such that when positions of the adjacent polyhedrons of the plurality of polyhedrons are shifted in the first direction, one or both of the adjacent polyhedrons are rotated.

10. The image display method according to claim 9, further comprising:

controlling the second motors to move each of the plurality of polyhedrons between a first position and a second position in the direction intersecting the plane direction, wherein when one of the adjacent polyhedrons is in the first position while an other one of the adjacent polyhedrons is in the first position, the circumcircles defined by the rotation trajectories of the adjacent polyhedrons overlap partially with each other, and wherein when the one of the adjacent polyhedrons is in the first position while the other one of the adjacent polyhedrons is in the second position, the circumcircles defined by the rotation trajectories of the adjacent polyhedrons do not overlap with each other.

* * * * *